(12) United States Patent
Lee et al.

(10) Patent No.: US 10,101,611 B2
(45) Date of Patent: Oct. 16, 2018

(54) DISPLAY DEVICE

(71) Applicant: LG Display Co., Ltd., Seoul (KR)

(72) Inventors: Yong-Seok Lee, Paju-si (KR); Ju-Sang Rhim, Seoul (KR)

(73) Assignee: LG Display Co., Ltd., Seoul (KR)

(*) Notice: Subject to any disclaimer, the term of this patent is extended or adjusted under 35 U.S.C. 154(b) by 37 days.

(21) Appl. No.: 15/465,338

(22) Filed: Mar. 21, 2017

(65) Prior Publication Data

US 2017/0315408 A1 Nov. 2, 2017

(30) Foreign Application Priority Data

Apr. 29, 2016 (KR) .......................... 10-2016-0053393

(51) Int. Cl.
*G02F 1/1335* (2006.01)
*G02F 1/1333* (2006.01)

(52) U.S. Cl.
CPC .. *G02F 1/133611* (2013.01); *G02F 1/133308* (2013.01); *G02F 1/133524* (2013.01); *G02F 1/133605* (2013.01); *G02F 1/133606* (2013.01); *G02F 1/133608* (2013.01); *G02F 1/13336* (2013.01); *G02F 1/133603* (2013.01); *G02F 2001/133317* (2013.01); *G02F 2001/133628* (2013.01)

(58) Field of Classification Search
CPC .................................................. G02F 1/133611
See application file for complete search history.

(56) References Cited

U.S. PATENT DOCUMENTS

2012/0162875 A1* 6/2012 Shimomichi ......... G06F 1/1601
361/679.01
2017/0153499 A1* 6/2017 Yang ................. G02F 1/133605

* cited by examiner

*Primary Examiner* — Edmond Lau
(74) *Attorney, Agent, or Firm* — Fenwick & West LLP

(57) ABSTRACT

A backplate having a folding region and an unfolding region adjacent to the folding region includes: first and second material layers corresponding to the folding and unfolding regions; and a third material layer between the first and second material layers, the third material layer is more rigid than the first and second materials layers, wherein the first and second material layers extend from the folding region to the unfolding regions such that a thickness of the first and second material layers is gradually reduced from the folding region to the unfolding region.

17 Claims, 11 Drawing Sheets

DISPLAY DEVICE

CROSS-REFERENCE TO RELATED APPLICATIONS

The present application claims the benefit of Republic of Korea Patent Application No. 10-2016-0053393 filed in the Republic of Korea on Apr. 29, 2016, which is hereby incorporated by reference in its entirety for all purposes as if fully set forth herein.

BACKGROUND

Field of the Disclosure

The present disclosure relates to a display device, and more particularly to a liquid crystal display device having a narrow bezel.

Discussion of the Background

Recently, as the information technology and the mobile communication technology progress, display devices that process and display a large amount of information have rapidly advanced. The display devices are classified into an emissive type display device having a self-emissive property and a non-emissive type display device including an additional light source.

For example, the non-emissive type display device may include a liquid crystal display (LCD) device. Since the LCD device does not include a self-emissive element, an additional light source is required. As a result, a backlight unit having a light source is disposed on a rear surface of a liquid crystal panel and supplies a light to the liquid crystal panel to display an image.

The backlight unit includes one of a cold cathode fluorescent lamp (CCFL), an external cathode fluorescent lamp (EEFL) and a light emitting diode (LED) as the light source. Specifically, the LED has been widely used because of its advantages such as small size, low power consumption, and high reliability.

The backlight unit is classified into a side light type and a direct light type according to an arrangement structure of lamps. In the side light type backlight unit, one lamp or a pair of lamps are disposed at one side portion of a light guide plate, or two lamps or two pairs of lamps are disposed at both side portions of a light guide plate. In a direct light type backlight unit, a plurality of lamps are disposed under an optical sheet.

Under a circumstance where a large-sized LCD device has been the subject of a recent research according to user's demand, the direct light type backlight unit has superiority for the large-sized LCD device to the side light type backlight unit.

FIG. 1 is a cross-sectional view showing a liquid crystal display device including a direct light type backlight unit having a light emitting diode as a light source according to the related art.

In FIG. 1, a liquid crystal display (LCD) device 1 includes a liquid crystal panel 10 having first and second substrates 12 and 14 and a backlight unit 20 disposed on a rear surface of the liquid crystal panel 10.

The backlight unit 20 includes a reflecting plate 22, a plurality of light emitting diodes (LEDs) 28, a diffusing plate 26 on the plurality of LEDs 28 and a plurality of optical sheets 27 on the diffusing plate 26.

Light emitted from adjacent two or three LEDs 28 are superposed and mixed and enters the liquid crystal panel 10 to provide a surface light source.

The backlight unit 20 having the plurality of LEDs 28 and the liquid crystal panel 10 are modularized by a top frame 40, a main frame 30 and a bottom frame 50. The main frame 30 having a rectangular ring shape surrounds edge portions of the liquid crystal panel 10 and the backlight unit 20, the top frame 40 surrounds front edge portions of the liquid crystal panel 10, and the bottom frame 50 covers a rear surface of the backlight unit 20. The main frame 30, the top frame 40 and the bottom frame 50 are combined with each other such that the backlight unit 20 and the liquid crystal panel 10 are integrated.

Since the usage of the LCD device 1 is enlarged from a portable computer to a monitor of a desktop computer and a wall-mountable television, a LCD device having a large-sized display area, a reduced weight and a reduced volume has been widely researched.

In addition, a LCD device having a narrow bezel, where a display region is enlarged and a non-display region of the bezel is reduced, as well as a light weight and a thin profile has been required.

However, the LCD device 1 has problems in obtaining a narrow bezel. For example, since the light from the plurality of LEDs 28 of the light source of the backlight unit 20 may not enter the edge portions of the liquid crystal panel 10, it may become difficult to obtain a narrow bezel.

The light emitted from the plurality of LEDs 28 of a point light source enters the liquid crystal panel 10 with a luminous view angle, and there exists a blind angle at the edge portions of the liquid crystal panel 10 where the light from the plurality of LEDs 28 does not enter the liquid crystal panel 10. Since the blind angle at the edge portions of the liquid crystal panel 10 is blocked, it is difficult to obtain the narrow bezel.

To display a single image with a large-sized panel (e.g. about 100 inches), a multi-panel display device such as a video wall where a plurality of LCD devices 1 are combined with each other in a tile shape has been widely researched. In the multi-panel display device, the bezel of each of the plurality of LCD devices 1 functions as an obstructive factor for continuity of an image. As a result, the LCD device 1 having a narrow bezel is required for the multi-panel display device.

SUMMARY

Accordingly, the present disclosure is directed to a liquid crystal display device having a narrow bezel and a multi-panel display device including the same that substantially obviates one or more of problems due to limitations and disadvantages of the prior art.

In accordance with the present disclosure, as embodied and broadly described herein, the present disclosure provides a display device including: a first liquid crystal liquid crystal display (LCD) device including: a liquid crystal panel; a backlight unit under the liquid crystal panel, the backlight unit including a first light emitting diode (LED) assembly having a plurality of first LEDs, a second LED assembly having a plurality of second LEDs, a diffusing plate, a reflecting plate and an optical sheet; a main frame having a rectangular ring shape and surrounding the liquid crystal panel and the backlight unit, the main frame including a vertical part and a light guide bar protruding from an inner surface of the vertical part, the second LED assembly disposed under the light guide bar; and a bottom frame combined with the main frame, the liquid crystal panel and the backlight unit are disposed on the bottom frame.

It is to be understood that both the foregoing general description and the following detailed description are exemplary and explanatory and are intended to provide further explanation of the embodiments as claimed.

BRIEF DESCRIPTION OF THE DRAWINGS

The accompanying drawings, which are included to provide a further understanding of the disclosure and are incorporated in and constitute a part of this specification, illustrate embodiments and together with the description serve to explain the principles of the disclosure. In the drawings.

DETAILED DESCRIPTION

Reference will now be made in detail to the present disclosure, examples of which are illustrated in the accompanying drawings.

Figure 1:
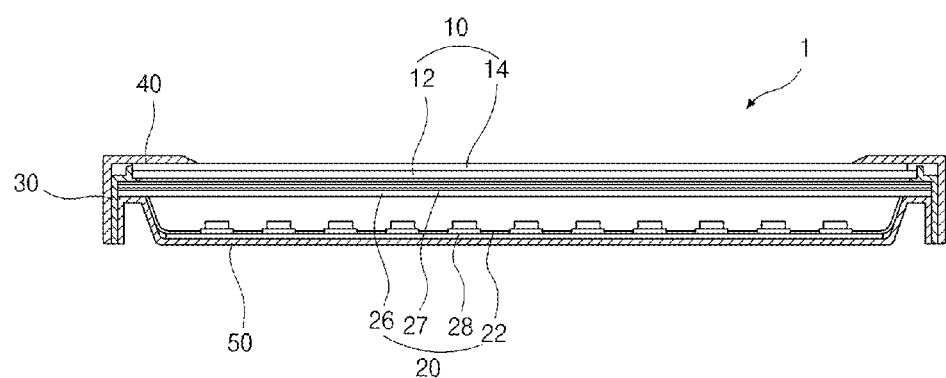
FIG. 1 is a cross-sectional view showing a liquid crystal display device including a direct light type backlight unit having a light emitting diode as a light source according to the related art.
Figure 2:
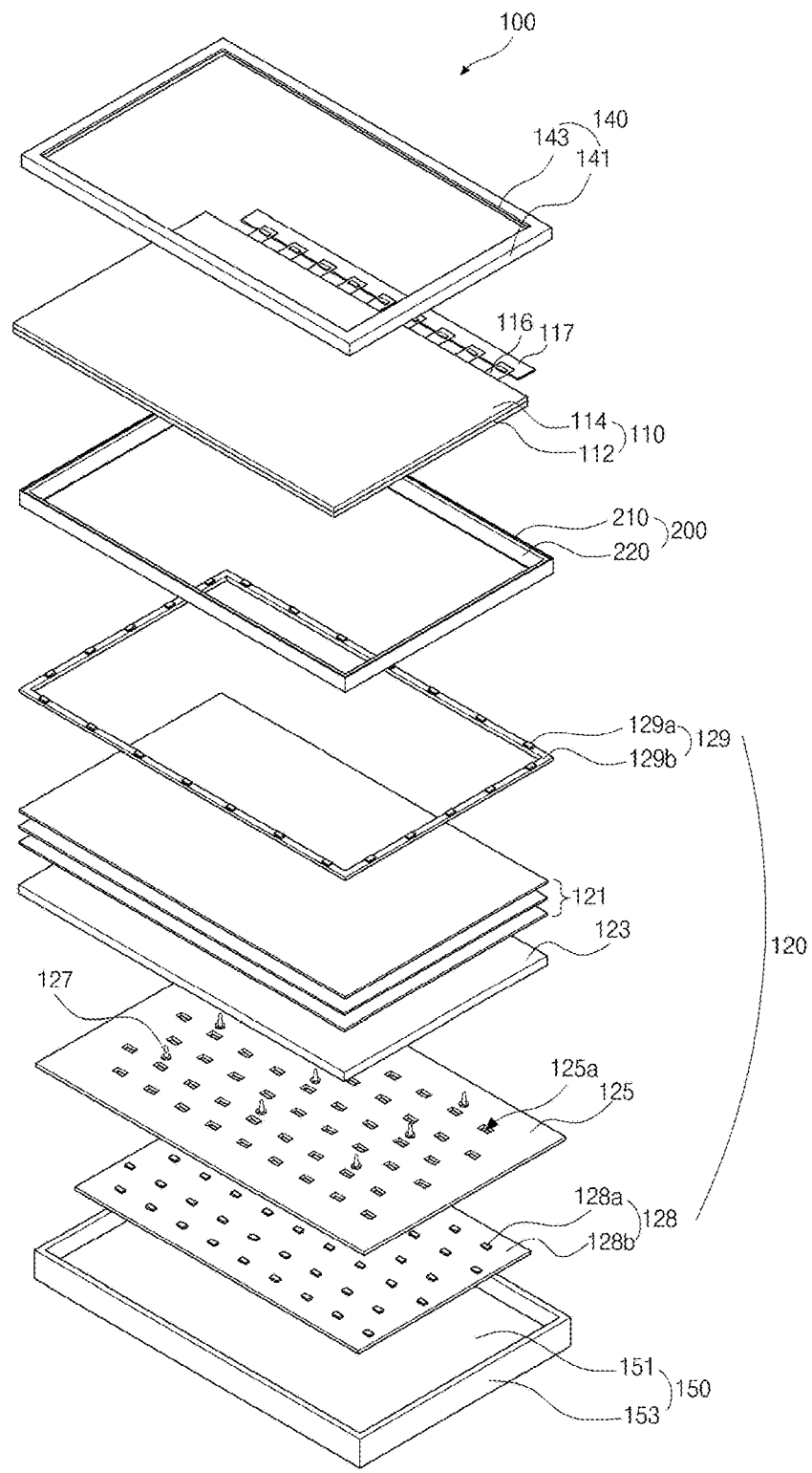
FIG. 2 is an exploded perspective view showing a liquid crystal display device according to a first embodiment of the present disclosure.

FIG. 2 is an exploded perspective view showing a liquid crystal display device according to a first embodiment of the present disclosure.

In FIG. 2, a liquid crystal display (LCD) device 100 includes a liquid crystal panel 110, a backlight unit 120, a top frame (case top) 140, a main frame (guide panel) 200 and a bottom frame (cover bottom) 150.

The backlight unit 120 is disposed on a rear surface of the liquid crystal panel 110. The main frame 200 having a rectangular ring shape surrounds edge portions of the liquid crystal panel 110 and the backlight unit 120. The top frame 140 is disposed on a front surface of the liquid crystal panel 110, and the bottom frame 150 is disposed on a rear surface of the backlight unit 120. The top frame 140, the main frame 200 and the bottom frame 150 are combined with each other to modularize the liquid crystal panel 110 and the backlight unit 120.

The liquid crystal panel 110 includes first and second substrates 112 and 114 facing and spaced apart from each other and a liquid crystal layer (not shown) between the first and second substrates 112 and 114. Although not shown, a plurality of gate lines and a plurality of data lines are formed on an inner surface of the first substrate (lower substrate, array substrate) 112. The gate line and the data line cross each other to define a pixel, and a thin film transistor (TFT) is connected to the gate line and the data line. A transparent pixel electrode in each pixel is connected to the TFT. In addition, a black matrix covering the gate line, the data line and the TFT is formed on an inner surface of the second substrate (upper substrate, color filter substrate) 114, and a color filter layer including red, green and blue color filters is formed on the black matrix. A transparent common electrode is formed on the color filter layer.

A printed circuit board (PCB) 117 is connected to at least one side of the liquid crystal panel 110 through a connector 116 such as a flexible printed circuit (FPC). The PCB 117 is bent and contacts a rear surface of the bottom frame 150 through a modularization process.

Although not shown, a first alignment layer is formed between the first substrate 112 and the liquid crystal layer, and a second alignment layer is formed between the second substrate 114 and the liquid crystal layer. In addition, a seal pattern is formed in edge portions between the first and second substrates 112 and 114 to prevent a leakage of the liquid crystal layer. First and second polarizing plates 119a and 119b (of FIG. 4A) are formed on outer surfaces of the first and second substrates 112 and 114, respectively.

The backlight unit 120 supplies a light to the liquid crystal panel 110 so that a transmittance difference of the liquid crystal panel 110 can be realized. The backlight unit 120 includes a first LED assembly 128, a reflecting plate 125, a diffusing plate 123 spaced apart from the first LED assembly 128 through a guide support 127, and an optical sheet 121 over the diffusing plate 123.

The first LED assembly 128 is a main light source of the backlight unit 120 and includes a first LED PCB 128b and a plurality of first LEDs 128a on the first LED PCB 128b. The first LED PCB 128b has a plate shape disposed on an inner surface of a lower surface 151 of the bottom frame 150. The plurality of first LEDs 128a are disposed to be spaced apart from each other.

Although not shown, for an excellent emitting efficiency and an excellent brightness, the plurality of first LEDs 128a may include a blue LED having a blue LED chip and a yellow fluorescent material such as cerium-doped yttrium aluminum garnet (YAG:Ce). A blue light emitted from the blue LED chip passes through the fluorescent material to be mixed with a yellow light emitted from the fluorescent material such that the first LED 128a emits a white light to the diffusing plate 123.

The reflecting plate 125 includes a plurality of through holes 125a. The plurality of first LEDs 128a penetrate through the plurality of through holes 125a such that the reflecting plate 125 covers the first LED PCB 128b and the lower surface 151 of the bottom frame 150 except the plurality of first LEDs 128a. As a result, the light toward a lower portion of the plurality of first LEDs 128a is reflected to the diffusing plate 123 and a brightness of light is improved.

The diffusing plate 123 and the optical sheet 121 are disposed over the plurality of first LEDs 128a exposed through the plurality of through holes 125a of the reflecting plate 125 for improving a uniformity of brightness. The diffusing plate 123 and the optical sheet 121 are supported by the guide support 127 to prevent a deflection of the diffusing plate 123 and the optical sheet 121. The optical sheet 121 may include a diffusing sheet and at least one collimating sheet to diffuse or collimate a light passed through the diffusing plate 123 and to provide a more uniform surface light source to the liquid crystal panel 110.

Accordingly, after the light emitted from the plurality of first LEDs 128a of the first LED assembly 128 is processed to become a uniform light of high quality while passing through the diffusing plate 123 and the optical sheet 121 and enters the liquid crystal panel 110, the liquid crystal panel 110 displays an image of high brightness using the light.

The liquid crystal panel 110 and the backlight unit 120 are modularized through the top frame 140, the main frame 200 and the bottom frame 150. The top frame 140 has a bent rectangular ring shape of a cross-section of "L" shape to cover edge portions of front and side surfaces of the liquid crystal panel 110. The top frame 140 includes a first edge part 141 covering the side surface of the liquid crystal panel 110 and a second edge part 143 covering the edge portion of the front surface of the liquid crystal panel 110. The top frame 140 has an opening so that an image of the liquid crystal panel 110 can be displayed through the opening.

The main frame 200 has a rectangular ring shape to support edge portions of rear surfaces of the liquid crystal panel 110, the diffusing plate 123 and the optical sheet 121 and to divide positions of the liquid crystal panel 110 and the backlight unit 120.

In addition, the main frame 200 maintains an optical gap or an air gap between the first LED assembly 128 and the diffusing plate 123. In the direct light type backlight unit 120 according to a first embodiment of the present disclosure, the optical gap or the air gap is formed between the first LED assembly 128 and the diffusing plate 123. The optical gap is a space where the lights emitted from the plurality of first LEDs 128a of the first LED assembly 128 are mixed. For example, the light from the plurality of first LEDs 128a may be uniformly mixed in the optical gap to enter the diffusing plate 123, or the optical gap may prevent a heat expansion of the diffusing plate 123 due to a heat of a high temperature generated from the plurality of first LEDs 128a.

The main frame 200 includes a vertical part 210 for maintaining the optical gap between the first LED assembly 128 and the diffusing plate 123 and a light guide bar 220 protruding an inner surface of the vertical part 210 to support the edge portions of the rear surface of the diffusing plate 123 and the optical sheet 121. The light guide bar 220 has a horizontal surface 221 (of FIG. 3A) perpendicularly extending from the vertical part 210. The edge portions of the rear surface of the liquid crystal panel 110 is attached and fixed to a front surface 210a (of FIG. 3A) of the vertical part 210 through an adhesive pad (not shown) such as a double-sided tape, and the edge portions of the rear surface of the diffusing plate 123 and the optical sheet 121 are disposed on and supported by the horizontal surface 221 of the light guide bar 220. As a result, the optical gap between the first LED assembly 128 and diffusing plate 123 is maintained.

Specifically, a second LED assembly 129 is disposed under the light guide bar 220. The second LED assembly 129 as an auxiliary light source of the backlight unit 120 includes a second LED PCB 129b having a bar shape and a plurality of second LEDs 129a spaced apart from each other on the second LED PCB 129b.

Although not shown, for excellent emitting efficiency and excellent brightness, the plurality of first LEDs 129a may include a blue LED having a blue LED chip and a yellow fluorescent material such as cerium-doped yttrium aluminum garnet (YAG:Ce). A blue light emitted from the blue LED chip passes through the fluorescent material to be mixed with a yellow light emitted from the fluorescent material such that the second LED 129a emits a white light to the light guide bar 220.

The light emitted from the plurality of second LEDs 129a enters the light guide bar 220 and passes through the light guide bar 220 by several total reflections to be provided to the edge portions of the liquid crystal panel 110.

As a result, in the LCD device 100 according to a first embodiment of the present disclosure, the light is uniformly supplied to a whole region of the liquid crystal panel 110 and an image is displayed through the whole of the liquid crystal panel 110. Since a display region of the liquid crystal panel 110 is enlarged and a non-display region of a bezel of the liquid crystal panel 110 is reduced, the LCD device 100 of a narrow bezel is obtained.

The bottom frame 150 is a base of modularization of the LCD device 100 where the liquid crystal panel 110 and the backlight unit 120 are disposed. The bottom frame 150 includes a lower surface 151 of a plate shape and a side surface 153 perpendicularly bent from edge portions of the lower surface 151.

The main frame 200 surrounding the edge portions of the liquid crystal panel 110 and the backlight unit 120 is combined with the top frame 140 surrounding the front edge portions of the liquid crystal panel 110 and the bottom frame 150 covering the rear surface of the backlight unit 120 so that the liquid crystal panel 110 and the backlight unit 120 can be modularized.

The top frame 140 may be referred to as a case top, a top cover or a top case, the main frame 200 may be referred to as a guide panel, a support main or a main support, and the bottom frame 150 may be referred to as a cover bottom, a bottom cover or a lower cover.

To obtain the LCD device 100 having a light weight and a thin profile, a top frame 140 may be omitted. The LCD device 100 may have a light weight and a thin profile and a fabrication process of the LCD device 100 may be simplified by omission of the top frame 140. In addition, a fabrication cost of the LCD device 100 may be reduced by omission of the top frame 140 of a metallic material.

In the LCD device 100 according to the first embodiment of the present disclosure, light is uniformly supplied to the edge portions of the liquid crystal panel 110 by forming the light guide bar 220 of the main frame 200 and disposing the second LED assembly 129 as an auxiliary light source under the light guide bar 220. Since the light is uniformly supplied to the whole region of the liquid crystal panel 110, a display region of the liquid crystal panel 110 is enlarged and a non-display region of a bezel of the liquid crystal panel 110 is reduced. As a result, the LCD device 100 of a narrow bezel is obtained.

Figure 3A:
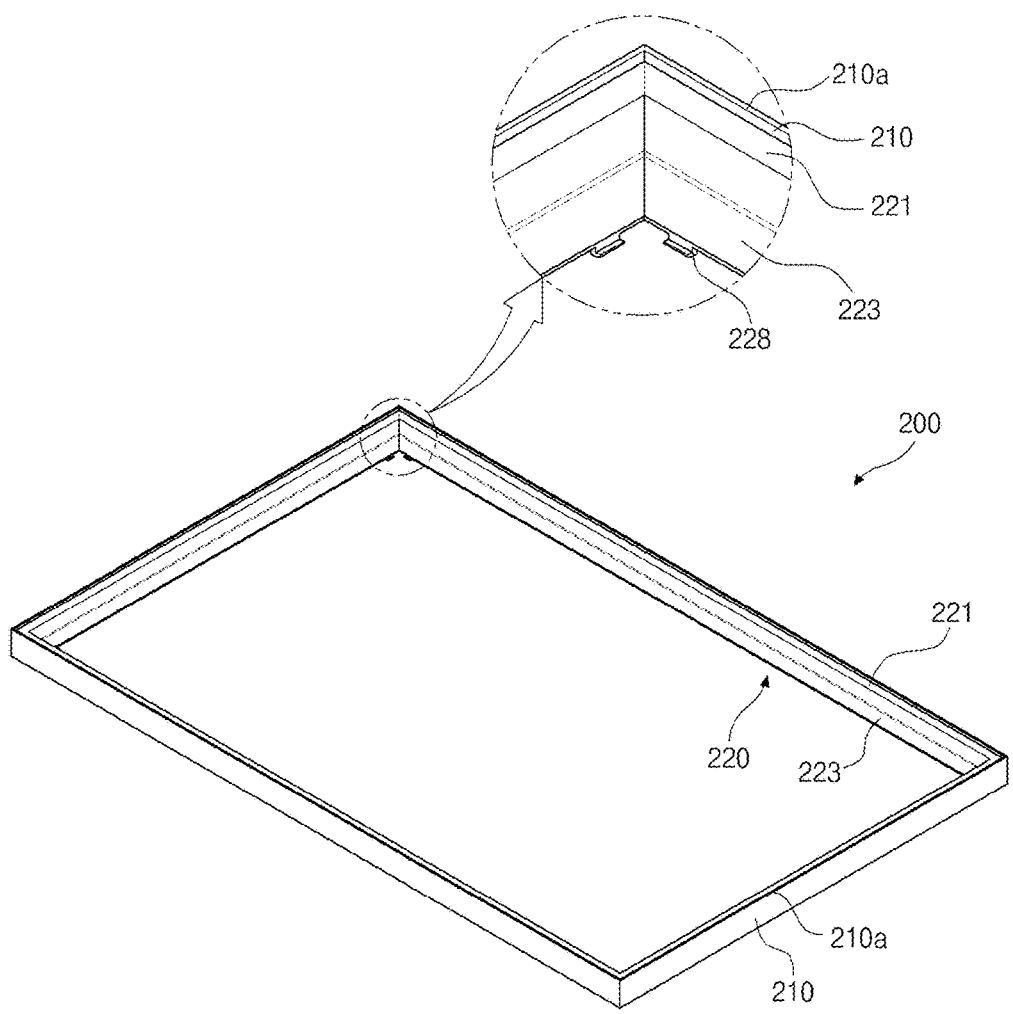
FIG. 3A is a perspective view showing a main frame of a liquid crystal display device according a first embodiment of the present disclosure.
Figure 3B:
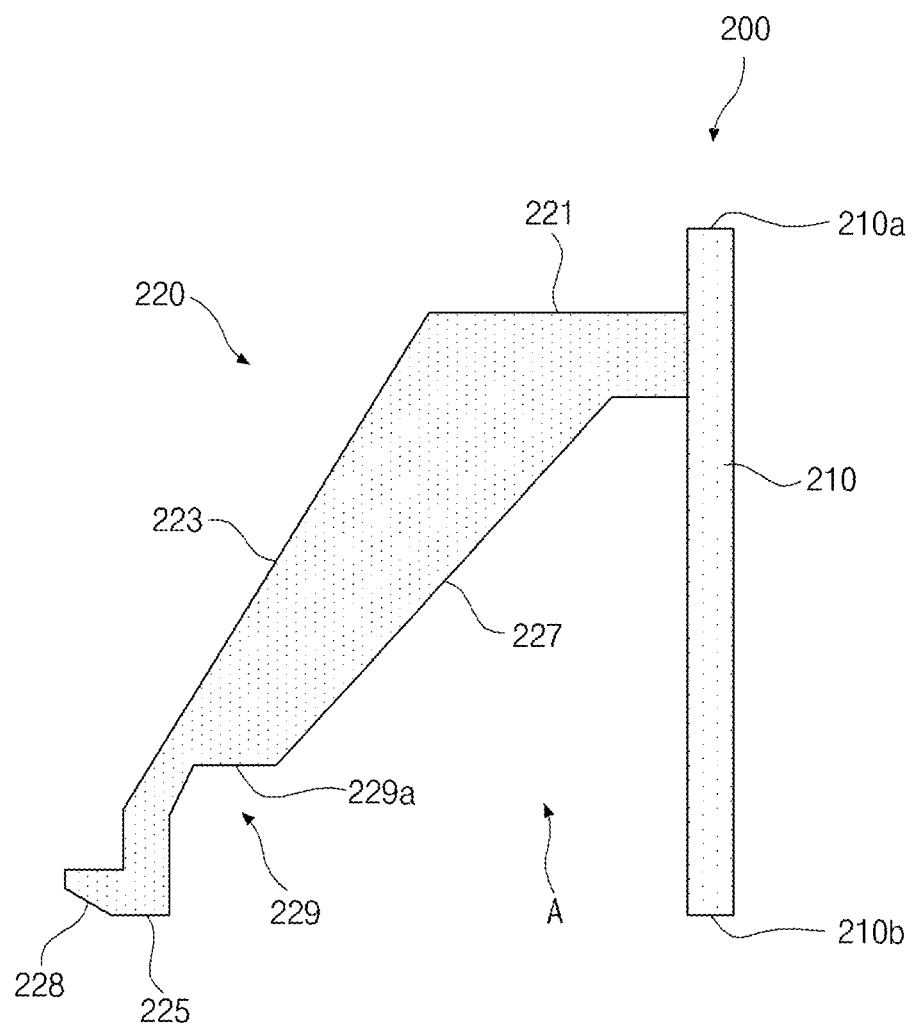
FIG. 3B is a cross-sectional view showing a main frame of a liquid crystal display device according a first embodiment of the present disclosure.

FIG. 3A is a perspective view showing a main frame of a liquid crystal display device according a first embodiment of the present disclosure, and FIG. 3B is a cross-sectional view showing a main frame of a liquid crystal display device according a first embodiment of the present disclosure.

In FIGS. 3A and 3B, the main frame 200 having a rectangular ring shape includes the vertical part 210 having front and rear surfaces 210a and 210b and the light guide bar 220 protruding from an inner surface of the vertical part 210.

The vertical part 210 of the main frame 200 may include a synthetic resin such as polycarbonate and may be formed through a molding process. The light guide bar 220 of the main frame 200 may include a transparent resin such as an acrylic resin. For example, the light guide bar 220 may include a plastic material such as polymethylmethacrylate (PMMA) and polycarbonate (PC). The light guide bar 220 may be formed of PMMA having advantages in transparency, weatherability and coloring property and inducing diffusion of a light.

The light guide bar 220 includes first and second horizontal surfaces 221 and 225 and first and second slanting surfaces 223 and 227 opposite to each other. The first horizontal surface 221 perpendicularly extends from an inner surface of the vertical part 210. The first slanting surface 223 obliquely extends from an edge portion of the first horizontal surface 221 with an obtuse angle toward the rear surface 210b of the vertical part 210. The second slanting surface 227 obliquely extends from an opposite surface of the first horizontal surface 221. The first and second slanting surfaces 223 and 227 may be disposed closer from the first horizontal surface 221 to the second horizontal surface 225.

The first and second slanting surfaces 223 and 227 are connected to both edge portions of the second horizontal surface 225. As a result, the inner surface of the vertical part 210 and the second slanting surface 227 of the light guide bar 220 define an inner space A of the main frame 200, and the second LED assembly 129 (of FIG. 2) of the auxiliary light source is disposed in the inner space A.

The light guide bar 220 includes a chamfer part 229 having a shape where the second slanting surface 227 and the second horizontal surface 225 are removed. The chamfer part 229 includes a light incident surface 229a parallel to the first and second horizontal surfaces 221 and 225, and the plurality of second LEDs 129a (of FIG. 2) of the second LED assembly 129 in the inner surface A between the inner surface of the vertical part 210 and the second slanting surface 227 are disposed to face into the light incident surface 229a.

The light guide bar 220 includes a hook 228 protruding from the first slanting surface 223 and the second horizontal surface 225.

A pattern (not shown) may be formed on the second slanting surface 227 of the light guide bar 220 for supplying a uniform surface light source. To guide a light incident into the light guide bar 220, the pattern may include an elliptical pattern, a polygonal pattern or a hologram pattern. The pattern may be formed through a printing method or an injection molding method.

In the main frame 200 according to the first embodiment of the present disclosure, since the light guide bar 220 guides the light to the vertical part 210 and the second LED assembly 129 of the auxiliary light source is disposed under the light guide bar 220, the light is uniformly supplied to the edge portions of the liquid crystal panel 110.

Figure 4A:
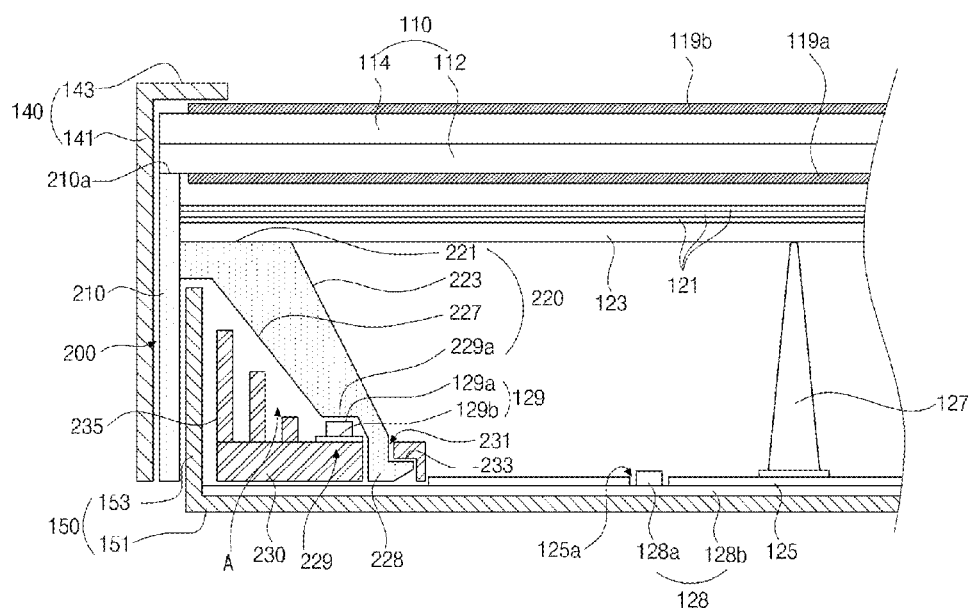
FIGS. 4A and 4B are cross-sectional views showing a liquid crystal display device according to first and second embodiments, respectively, of the present disclosure.
Figure 4B:
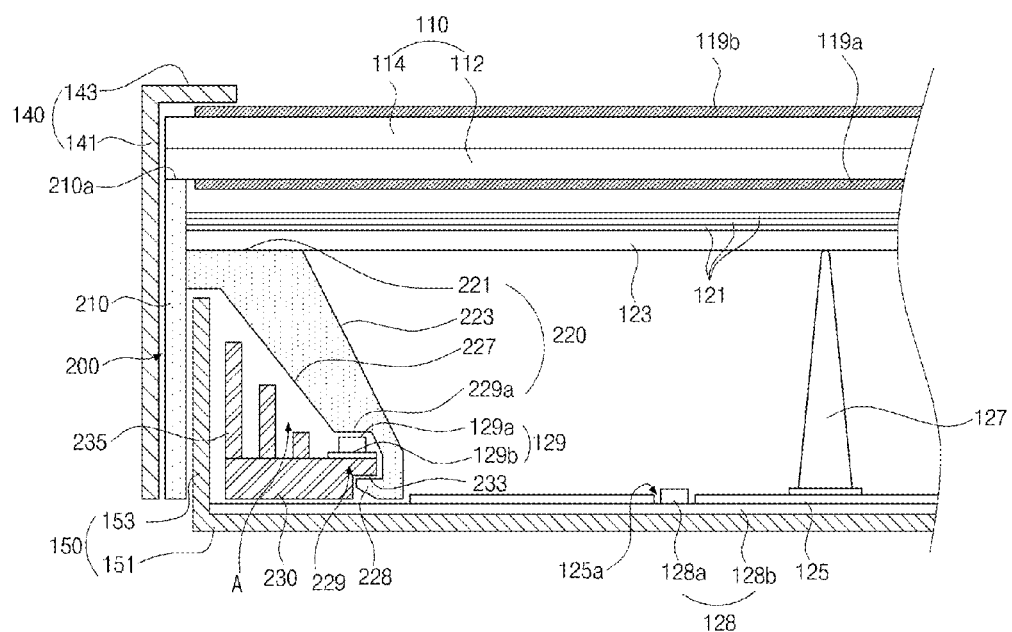

FIGS. 4A and 4B are cross-sectional views showing a liquid crystal display device according to first and second embodiments, respectively, of the present disclosure.

In FIG. 4A, the backlight unit 120 (of FIG. 2) includes the first LED assembly 128, the reflecting plate 125, the diffusing plate 123 and the optical sheet 121. The first LED assembly 128 includes the first LED PCB 128b of a plate shape and the plurality of first LEDs 128a on the first LED PCB 128b, and the plurality of through holes 125a of the reflecting plate 125 expose the plurality of first LEDs 128a of the first LED assembly 128. The diffusing plate 123 and the optical sheet 121 are disposed over the first LED assembly 128.

The liquid crystal panel 110 including the first and second substrates 112 and 114 and the liquid crystal layer between the first and second substrates 112 and 114 is disposed over the backlight unit 120, and the first and second polarizing plates 119a and 119b selectively transmitting a light are formed on the outer surfaces of the first and second substrates 112 and 114, respectively.

The backlight unit 120 and the liquid crystal panel 110 are modularized and integrated as one body by the main frame 200, the top frame 140 and the bottom frame 150. The first LED assembly 128 is disposed over the lower surface 151 of the bottom frame 150, and the reflecting plate 125 is disposed over the first LED assembly 128 such that the plurality of through holes 125a selectively expose the plurality of first LEDs 128a.

The diffusing plate 123 is disposed over the first LED assembly 128 with the optical gap and is supported by the guide support 127. The optical sheet 121 is disposed over the diffusing plate 123.

The main frame 200 surrounds the edge portions of the backlight unit 120 including the first LED assembly 128, the diffusing plate 123 and the optical sheet 121, and the edge portions of the rear surface of the diffusing plate 123 and the optical sheet 121 are disposed on and are supported by the first horizontal surface 221 of the light guide bar 220 of the main frame 200. The edge portions of the rear surface of the liquid crystal panel 110 over the optical sheet 121 are disposed on and are supported by the front surface 210a of the vertical part 210 of the main frame 200.

Since the edge portions of the rear surface of the diffusing plate 123 and the optical sheet 121 are disposed on and are supported by the first horizontal surface 221 of the main frame 200, the diffusing plate 123 is spaced apart from the plurality of first LEDs 128a of the first LED assembly 128 by the main frame 200 and the guide support 127 to maintain the optical gap.

The top frame 140 surrounds the edge portions of the front and side surfaces of the liquid crystal panel 110 such that an inner surface of the first edge part 141 of the top frame 140 contacts an outer surface of the vertical part 210 of the main frame 200, and the top frame 140 and the main frame 200 are assembled and combined. In addition, the inner surface of the vertical part 210 of the main frame 200 contacts an outer surface of the side surface 153 of the bottom surface 150, and the main frame 200 and the bottom frame 150 are assembled and combined. As a result, the top frame 140, the main frame 200 and the bottom frame 150 are assembled and combined, and the backlight unit 120 and the liquid crystal panel 110 are modularized as one body by the main frame 200, the top frame 140 and the bottom frame 150.

The LCD device 100 (of FIG. 2) further includes the second LED assembly 129 as the auxiliary light source. The second LED assembly 129 is disposed under the light guide bar 220 of the main frame 200 in the inner space A between the inner surface of the vertical part 210 and the second slanting surface 227 of the light guide bar 220.

The second LED assembly 129 is disposed in the inner space A such that the plurality of second LEDs 129a face into the light incident surface 229a of the chamfer part 229 of the light guide bar 220. As a result, light enters the light guide bar 220.

The light emitted from the plurality of second LEDs 129a and incident into the light guide bar 220 passes through the light guide bar 220 by several total reflections to be emitted from the light guide bar 220 as a surface light source. In addition, the pattern (not shown) is formed on the second slanting surface 227 of the light guide bar 220 for guiding a light, and the light incident into the light guide bar 220 is emitted through the first horizontal surface 221 and the first slanting surface 223 as a surface light source.

The light emitted through the first slanting surface 223 is mixed with the light emitted from the plurality of first LEDs 128a of the first LED assembly 128 and is uniformly processed through the diffusing plate 123 and the optical sheet 121 to be supplied to the liquid crystal panel 110. The light emitted through the first horizontal surface 221 is uniformly processed through the diffusing plate 123 and the optical sheet 121 to be supplied to the edge portions of the liquid crystal panel 110.

In the LCD device 100 according to the first embodiment of the present disclosure, since the relatively large amount of light is supplied to the liquid crystal panel 110, the brightness of the LCD device 100 increases. In addition, since light is supplied to the edge portions of the liquid crystal panel 110, the image is displayed through the whole of the liquid crystal panel 110. Accordingly, the bezel of the non-display region of the liquid crystal panel 110 is reduced, and the LCD device 100 having a narrow bezel is obtained.

Since a temperature of the plurality of first LEDs 128a of the first LED assembly 128 and the plurality of second LEDs 129a of the second LED assembly 129 as an emitting element increases according to a time of usage, a lifetime and a brightness of the plurality of first LEDs 128a may be changed according to the time of usage.

Since the first LED assembly 128 is disposed on the lower surface 151 of the bottom frame 150, heat of a relatively high temperature generated from the plurality of first LEDs 128a of the first LED assembly 128 is rapidly and effectively radiated through the lower surface 151 of the bottom frame 150 of a metallic material.

However, since the second LED assembly 129 is disposed over a smaller portion of the lower surface 151 as compared with the first LED assembly 128, an LED housing 230 may be disposed between the second LED assembly 129 and the lower surface 151 for radiating heat of a relatively high temperature generated from the plurality of second LEDs 129a of the second LED assembly 129.

The LED housing 230 may have a bar shape where the second LED assembly 129 is disposed and may include a metallic material having a relatively high heat conductivity. The LED housing 230 may have a heat sink type. For example, one edge portion of the LED housing 230 having the second LED assembly 129 thereon may be disposed such that the second LED assembly 230 faces into the light incident surface 229a of the light guide bar 220, and the other edge portion of the LED housing 230 may have a plurality of radiation fins 235 thereon. As a result, heat of a relatively high temperature generated from the plurality of second LEDs 129a of the second LED assembly 129 is rapidly and effectively radiated through the LED housing 230 having the plurality of radiation fins 235.

The LED housing may have a hole 231 and a step part 233 may be formed in the hole 231. When the hook 228 is inserted into the hole 231, the hook 228 of the light guide bar 220 may be assembled with the step part 233 such that the light guide bar 220 and the LED housing 230 are strongly combined. The hook 228 of the light guide bar 220 may protrude from the first slanting surface 223 and the second horizontal surface 225 toward a central portion of the main frame 200 opposite to the vertical part 210.

In FIG. 4B, a step part 233 may be formed on an end portion of the LED housing 230, and the hook 228 of the light guide bar 220 of the main frame 200 may be assembled with the step part 233 such that the light guide bar 220 and the LED housing 230 are strongly combined. The hook 228 of the light guide bar 220 may protrude from the first slanting surface 223 and the second horizontal surface 225 toward the inner space A and the vertical part 210. The LED housing 230 may be disposed only in the inner space A in the second embodiment.

In the main frame 200 according to the first and second embodiments of FIGS. 4A and 4B, since the hook 228 of the light guide bar 220 is combined with the step part 233 of the LED housing 230, the optical gap between the light incident surface 229a of the light guide bar 220 and the plurality of second LEDs 129a of the second LED assembly 129 is maintained. In addition, since the heat of a relatively high temperature of the plurality of second LEDs 129a is rapidly and effectively radiated through the LED housing 230, a thermal deformation of the light guide bar 220 of the main frame 200 of a transparent resin such as PMMA and PC is minimized.

Figure 5A:
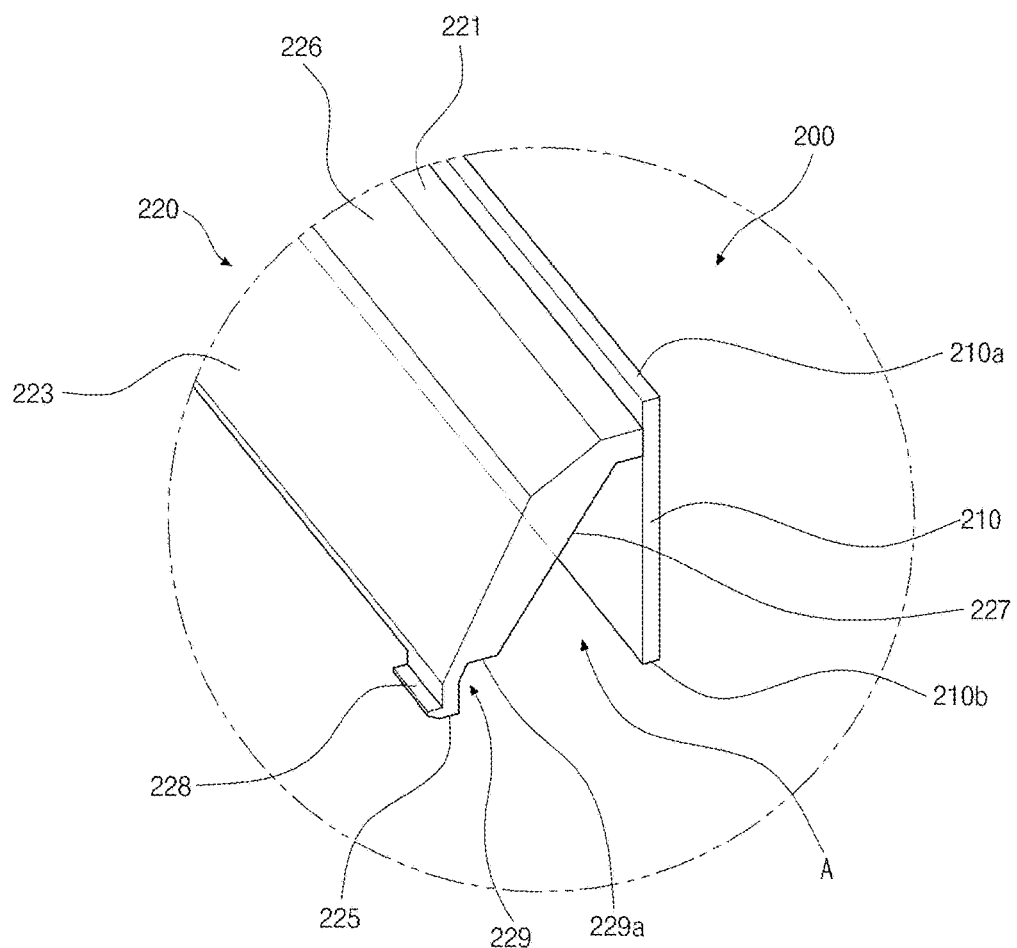
FIGS. 5A to 5C are perspective views showing a main frame of a liquid crystal display device according to third to fifth embodiments, respectively, of the present disclosure.
Figure 5B:
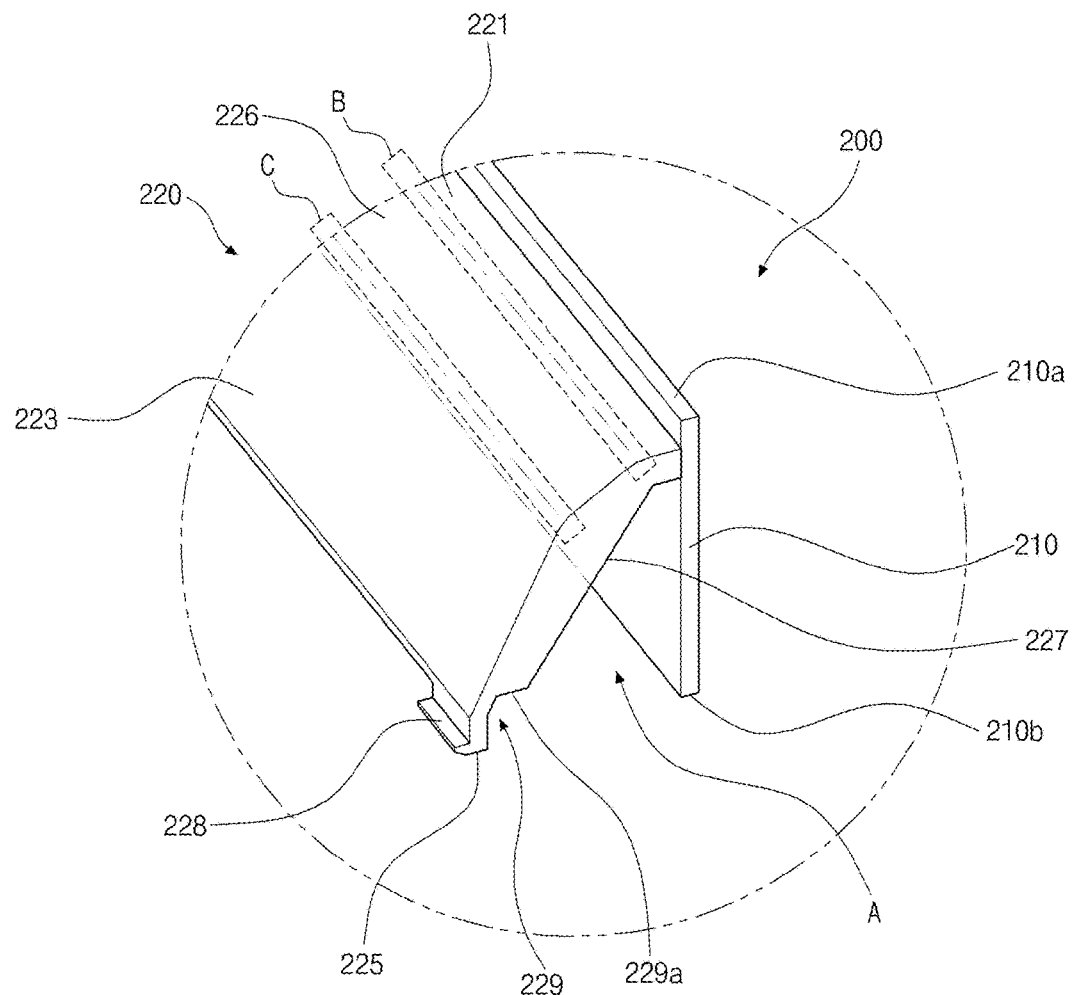
Figure 5C:
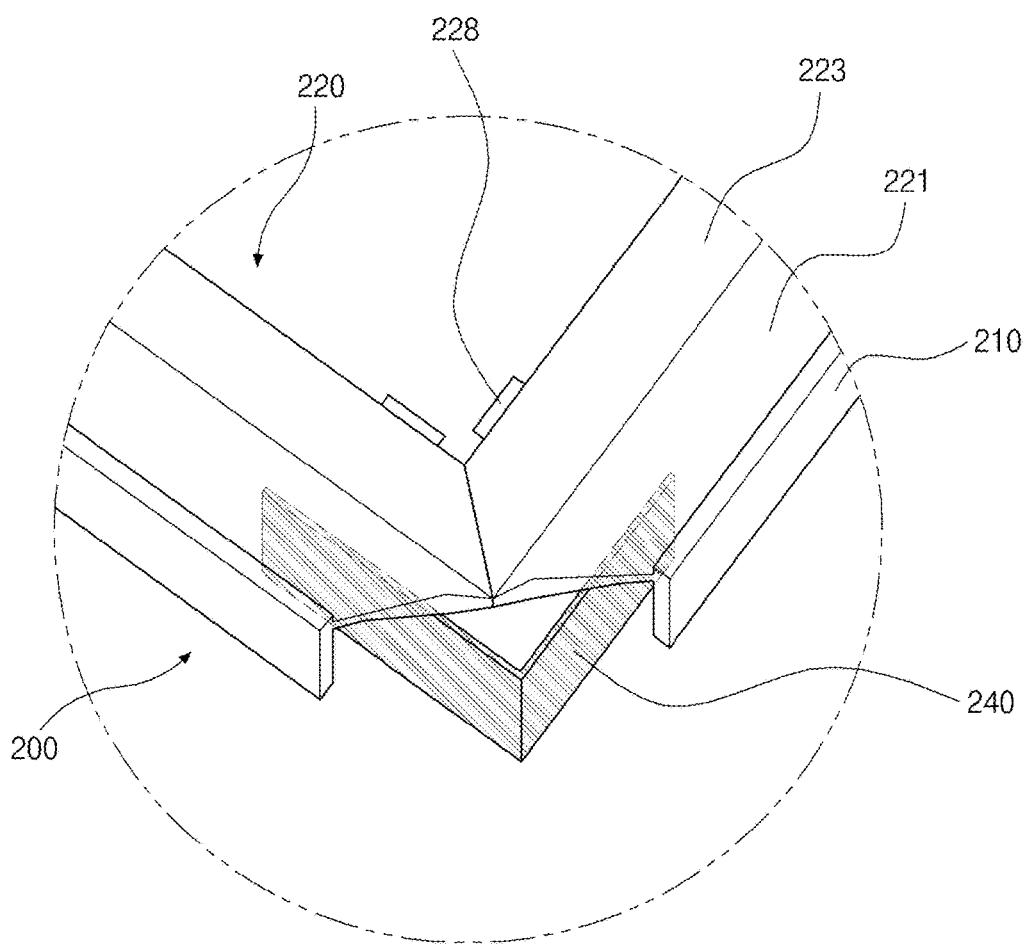

FIGS. 5A to 5C are perspective views showing a main frame of a liquid crystal display device according to third to fifth embodiments, respectively, of the present disclosure.

In the main frame 200 of FIG. 5A, the light guide bar 220 of a transparent resin such as PMMA and PC protrudes from the inner surface of the vertical part 210 of a synthetic resin for a molding process. The light guide bar 220 includes first and second horizontal surfaces 221 and 225 and first, second and third slanting surfaces 223, 227 and 226. The first and second horizontal surfaces 221 and 225 are parallel to each other. The hook 228 protrudes from the first slanting surface 223 and the second horizontal surface 225 at both end portions of the light guide bar 220.

The inner space A is defined between the inner surface of the vertical part 210 and the second slanting surface 227, and the chamfer part 229 including the light incident surface 229a is formed on the second slanting surface 227 and the second horizontal surface 225. The third slanting surface 226 is disposed between the first horizontal surface 221 and the first slanting surface 223 with obtuse angles.

In the main frame 200 of FIG. 5B, a first connecting portion B between the first horizontal surface 221 and the third slanting surface 226 and a second connecting portion C between the third slanting surface 226 and the first slanting surface 223 are formed to be rounded.

In the light guide bar 220 of the main frame 200 according to the third and fourth embodiments of the present disclosure, the third slanting surface 226 may be disposed between the first horizontal surface 221 and the first slanting surface 223, or the first connecting portion B between the first horizontal surface 221 and the third slanting surface 226 and the second connecting portion C between the third slanting surface 226 and the first slanting surface 223 are rounded. As a result, deterioration such as a bright line of a step shape due to a light bounce phenomenon at a corner region of the light guide bar 220 is minimized.

While the light emitted from the plurality of second LEDs 129a (of FIG. 4A) of the second LED assembly 129 (of FIG. 4A) is totally reflected in the light guide bar 220, a portion of the light may not be totally reflected at the corner region of the light guide bar 220 and the light bounce phenomenon where the light is scattered may occur. The light bounce phenomenon may cause deterioration such as the bright line of the step shape where the corner region of the light guide bar 220 is relatively brighter than the other region. Since the bright line of the step shape reduces the brightness uniformity, a product reliability of the LCD device 100 (of FIG. 2) is reduced.

In the main frame 200 according to the third embodiment of the present disclosure of FIG. 5A, since the third slanting surface 226 is further formed in the light guide bar 220, a region corresponding the corner region increases to alleviate the bright line of the step shape by a light spread. In the main frame 200 according to the fourth embodiment of the present disclosure, since the first and second connecting portions B and C are rounded, the light bounce phenomenon at the corner region is minimized to prevent the bright line of the step shape. Accordingly, the reduction of the brightness uniformity of the LCD device 100 is prevented and the product reliability of the LCD device 100 is improved.

In FIG. 5C, a portion of the vertical part 210 and the first horizontal surface 221 of the light guide bar 220 is removed at a corner region of the main frame 200, and a reflecting sheet 240 instead of the removed portion is disposed at the corner region of the main frame 200. The light brightness at the corner region of the main frame 200 is further improved.

While the light emitted from the plurality of second LEDs 129a (of FIG. 4A) of the second LED assembly 129 (of FIG. 4A) in the inner space A between the vertical part 210 and the second slanting surface 227 enters the light guide bar 220, a portion of the light may not enter the light guide bar 220 and light leakage where a light is emitted toward the central portion of the main frame 200 opposite to the vertical part 210 may occur.

In the main frame 200 according to the fifth embodiment of the present disclosure of FIG. 5C, since the reflecting sheet 240 is disposed at the corner region of the main frame 200 and the portion of the main frame 200 at the corner region is removed, the light that does not enter the light guide bar 220 among the light emitted from the plurality of second LEDs 129a is reflected on the reflecting sheet 240 and enters the light guide bar 220 through the removed portion of the main frame 200. As a result, the light brightness at the corner region of the main frame 200 is improved.

Figure 6:
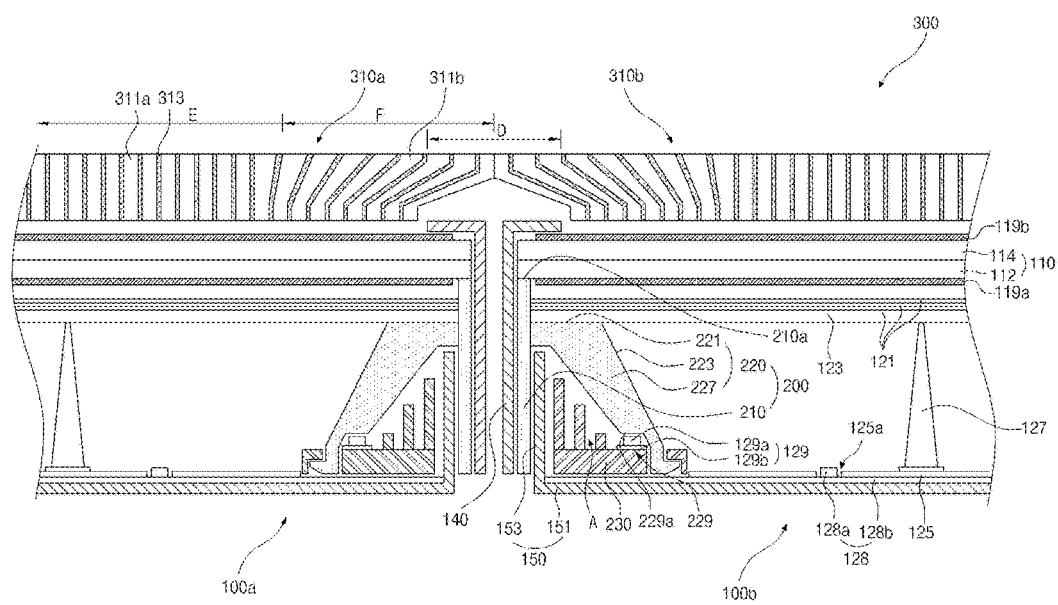
FIG. 6 is a cross-sectional view showing a multi-panel display device according to a sixth embodiment of the present disclosure.
Figure 7:
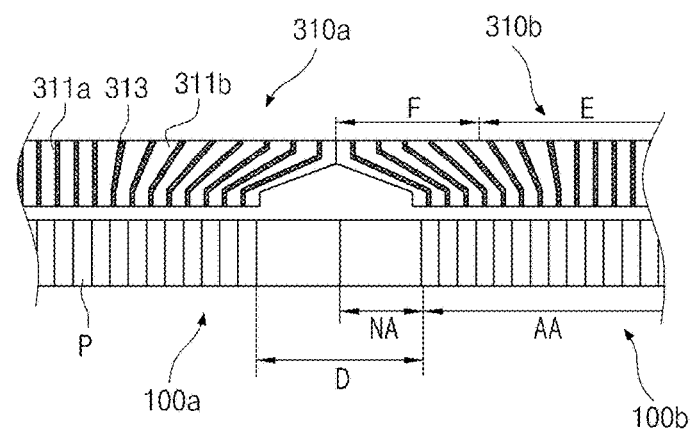
FIG. 7 is a cross-sectional view showing a compensation structure for an image severance phenomenon according to a sixth embodiment of the present disclosure.

FIG. 6 is a cross-sectional view showing a multi-panel display device according to a sixth embodiment of the present disclosure, and FIG. 7 is a cross-sectional view showing a compensation structure for an image severance phenomenon according to a sixth embodiment of the present disclosure.

In FIG. 6, a multi-panel display device 300 includes a plurality of liquid crystal display (LCD) devices 100a and 100b and a plurality of optical members 310a and 310b over the plurality of LCD devices 100a and 100b, respectively. Each of the plurality of LCD devices 100a and 100b may have the same structure as the LCD device 100 (of FIG. 2) of the first embodiment. The plurality of LCD devices 100a and 100b are connected to each other in a tile shape. Each of the plurality of optical members 310a and 310b includes a plurality of optical fibers 311a and 311b for overcoming an image severance phenomenon.

To display a single image with a large-sized panel (e.g. about 100 inches) such as a video wall, the plurality of LCD devices 100a and 100b are disposed in a tile shape. Since each of the plurality of LCD devices 100a and 100b includes a bezel D, an image severance phenomenon where an image is not displayed in a connecting region of the plurality of LCD devices 100a and 100b may occur. However, since the plurality of optical members 310a and 310b for expanding and displaying the connecting region are disposed over the plurality of LCD devices 100a and 100b, the image of each of the plurality of LCD devices 100a and 100b expands and is displayed in the bezel D through the plurality of optical members 310a and 310b. As a result, the image severance phenomenon due to the bezel D may be prevented.

In FIG. 7, each of the plurality of LCD devices 100a and 100b includes the liquid crystal panel 110 where a plurality of pixels P are defined. The liquid crystal panel 110 includes a display region AA and a non-display region NA. The display region AA displays an image and is disposed at a central portion of the liquid crystal panel 110, and the non-display region NA surrounds the display region AA and does not display an image.

The non-display region NA may be formed by a non-display area of the liquid crystal panel 110 itself, a portion blocked by the backlight unit 120 (of FIG. 2) and the top frame 140 for modularizing the liquid crystal panel 110 and the backlight unit 120. Since each of the plurality of LCD devices 100a and 100b includes the non-display region NA, the image severance phenomenon where an image is not displayed due to the non-display region NA may occur in the bezel D of the connecting region of the plurality of LCD devices 100a and 100b.

However, since the plurality of optical members 310a and 310b over the plurality of LCD devices 100a and 100b refract or expand a light path of an image displayed by the plurality of LCD devices 100a and 100b in the non-display region NA, the image is displayed in the non-display region NA of the bezel D of the connecting region of the plurality of LCD devices 100a and 100b, and the image severance phenomenon is prevented.

Each of the plurality of optical members 310a and 310b includes a plurality of optical fibers 311a and 311b and a resin support 313. Each of the plurality of optical fibers 311a and 311b has a lower input surface and an upper output surface. The resin support 313 is disposed among the plurality of optical fibers 311a and 311b and supports the plurality of optical fibers 311a and 311b so that the plurality of optical fibers 311a and 311b can be combined with each other. Each of the plurality of optical members 310a and 310b has a light transparency.

A lower surface of each of the plurality of optical members 310a and 310b corresponds to and is disposed over each of the plurality of LCD devices 100a and 100b. The input surface of each of the plurality of optical fibers 311a and 311b may correspond to each of the plurality of pixels P of the liquid crystal panel 110. Light emitted from each of the plurality of pixels P and incident to the input surface of each of the plurality of optical fibers 311a and 311b is totally reflected in each of the plurality of optical fibers 311a and 311b and is emitted from the output surface of each of the plurality of optical fibers 311a and 311b. As a result, the image of the plurality of pixels P of the liquid crystal panel 110 is displayed by an upper surface of each of the plurality of optical members 310a and 310b.

Each of the plurality of optical fibers 311a and 311b in the plurality of optical members 310a and 310b includes at least one core in a central portion thereof and a cladding wrapping the core. Since a refractive index of the core is greater than a refractive index of the cladding, the light incident to the input surface is transmitted to the output surface through a total reflection.

Each of the plurality of optical members 310a and 310b includes a non-expansion region E in a central portion thereof and an expansion region F in an edge portion thereof. The expansion region F surrounds the non-expansion region E. The plurality of optical fibers 311a and 311b are classified into a plurality of first optical fibers 311a in the non-expansion region E and a plurality of second optical fibers 311b in the expansion region F. The non-expansion region E corresponds to a first portion of the display region AA, and the expansion region F corresponds to the non-display region NA and a second portion of the display region AA surrounding the first portion of the display region AA.

The plurality of first optical fibers 311a in the non-expansion region E may have a straight type where the light incident to the input surface is intactly emitted from the output surface. The input surface and the output surface may have the same area as each other in the straight type optical fiber. The plurality of first optical fibers 311a may transmit the image of the plurality of pixels P from the lower surface of the plurality of optical members 310a and 310b without expansion.

The plurality of second optical fibers 311b in the expansion region F may have a bent type where the light incident to the input surface is emitted from the output surface by refraction and expansion. The plurality of second optical fibers 311b may transmit the image of the plurality of pixels P from the lower surface of the plurality of optical members 310a and 310b with expansion.

In the plurality of second optical fibers 311b of the expansion region F, the input surface and the output surface are not aligned along a straight line such that the input surface corresponds to the plurality of pixels P in the edge portions of the plurality of LCD devices 100a and 100b and the output surface corresponds to the non-display region NA of the plurality of LCD devices 100a and 100b. As a result, the plurality of second optical fibers 311b have a slanted and bent structure toward the non-display region NA of the plurality of LCD devices 100a and 100b.

An expansion ratio of the image by each of the plurality of optical fibers 311a and 311b is determined according to a size ratio between areas of the output surface and the input surface of each of the plurality of optical fibers 311a and 311b. In each of the plurality of second optical fiber 311b of the expansion region F, an area of the output surface may be greater than an area of the input surface. Since the light incident to the input surface of each of the plurality of second optical fibers 311b is totally reflected and is emitted from the output surface having an area greater than the input surface, the image of the corresponding pixels P is expanded by the size ratio between the output surface and the input surface to be recognized.

Since the image is displayed even through the non-display region NA of the plurality of LCD devices 100a and 100b, the image severance phenomenon in the bezel D of the connecting region of the plurality of LCD devices 100a and 100b is prevented while the single image is displayed through the plurality of LCD devices 100a and 100b.

The resin support 313 may include a heat curable resin or a light curable resin. After the plurality of optical fibers 311a and 311b are arranged and a space among the plurality of optical fibers 311a and 311b is filled with a resin, the resin is cured with a heat or a light such as ultraviolet (UV). As a result, the plurality of optical members 310a and 310b including the plurality of optical fibers 311a and 311b are formed.

Although the resin support 313 may include a transparent resin, a material for the resin support 313 is not limited to the transparent resin. A refractive index of the resin for the resin support 313 may be smaller than a refractive index of the plurality of optical fibers 311a and 311b.

In the multi-panel display device 300 according to the sixth embodiment where the plurality of optical members 310a and 310b are disposed over the plurality of LCD devices 100a and 100b, since each of the plurality of LCD devices 100a and 100b has a relatively small non-display region NA, the image severance phenomenon due to the bezel D is effectively prevented.

In each of the plurality of LCD devices 100a and 100b, since the light guide bar 220 is formed in the main frame 200 and the second LED assembly 129 of the auxiliary light source is disposed under the light guide bar 220, the light is uniformly supplied to the edge portions of the liquid crystal panel 110. Since the light is uniformly supplied to the whole region of the liquid crystal panel 110, the display region AA of the liquid crystal panel 110 is enlarged and the non-display region NA of the bezel D is reduced. Accordingly, the plurality of LCD devices 100a and 100b having a narrow bezel are obtained.

Each of the plurality of LCD devices 100a and 100b includes the backlight unit 120 (of FIG. 2), and the backlight unit 120 includes the first LED assembly 128, the reflecting plate 125, the diffusing plate 123 spaced apart from the first LED assembly 128 through the guide support 127, and the optical sheet 121 over the diffusing plate 123. The first LED assembly 128 includes the first LED PCB 128b of a plate shape and a plurality of first LEDs 128a on the first LED PCB 128b, and the plurality of first LEDs 128a penetrate through the plurality of through holes 125a of the reflecting plate 125 such that the reflecting plate 125 covers the first LED PCB 128b except the plurality of first LEDs 128a.

The liquid crystal panel 110 including the first and second substrates 112 and 114 and the liquid crystal layer (not shown) between the first and second substrates 112 and 114 is disposed over the backlight unit 120, and the first and second polarizing plates 119a and 119b selectively transmitting a light are formed on the outer surfaces of the first and second substrates 112 and 114, respectively.

The backlight unit 120 and the liquid crystal panel 110 are modularized and integrated as one body by the main frame 200, the top frame 140 and the bottom frame 150. The edge portions of the rear surface of the diffusing plate 123 and the optical sheet 121 are disposed on and are supported by the first horizontal surface 221 of the main frame 200, and the edge portions of the rear surface of the liquid crystal panel 110 over the optical sheet 121 are disposed on and are supported by the front surface 210a of the vertical part 210 of the main frame 200.

The backlight unit 120 further includes the second LED assembly 129 as the auxiliary light source. The second LED assembly 129 is disposed under the light guide bar 220 of the main frame 200 in the inner space A between the inner surface of the vertical part 210 and the second slanting surface 227 of the light guide bar 220. The plurality of second LEDs 129a face into the light incident surface 229a of the chamfer part 229 of the light guide bar 220 and the light of the plurality of second LEDs 129a enters the light guide bar 220.

The light emitted from the plurality of second LEDs 129a and incident into the light guide bar 220 passes through the light guide bar 220 by several total reflections to be emitted from the light guide bar 220 as a surface light source. In addition, the pattern (not shown) is formed on the second slanting surface 227 of the light guide bar 220 for guiding a light, and the light incident into the light guide bar 220 is emitted through the first horizontal surface 221 and the first slanting surface 223 as a surface light source.

The light emitted through the first slanting surface 223 is mixed with the light emitted from the plurality of first LEDs 128a of the first LED assembly 128 and is uniformly processed through the diffusing plate 123 and the optical sheet 121 to be supplied to the liquid crystal panel 110. The light emitted through the first horizontal surface 221 is uniformly processed through the diffusing plate 123 and the optical sheet 121 to be supplied to the edge portions of the liquid crystal panel 110.

In each of the plurality of LCD devices 100*a* and 100*b* of the multi-panel display device 300 according to the sixth embodiment of the present disclosure, since the relatively large amount of light is supplied to the liquid crystal panel 110, the brightness of each of the plurality of LCD devices 100*a* and 100*b* increases. In addition, since the display region AA is enlarged and the non-display region NA of the bezel D is reduced, each of the plurality of LCD devices 100*a* and 100*b* has a narrow bezel. Accordingly, the image severance phenomenon due to the bezel D is effectively prevented. Further, since the brightness of the image in the edge portions of each of the plurality of LCD devices 100*a* and 100*b* increases, the image severance phenomenon is minimized even when the multi-panel display device 300 according to the sixth embodiment of the present disclosure has the bezel D corresponding to the related art bezel.

Figure 8A:
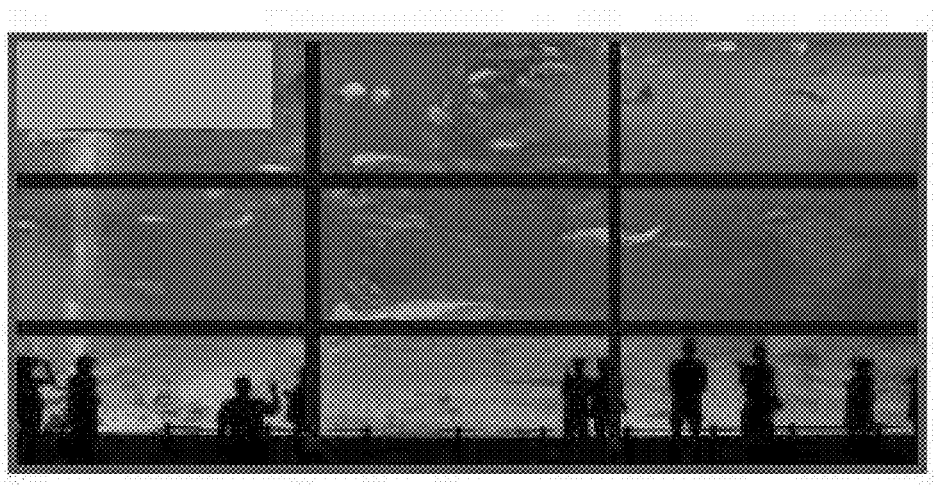
FIG. 8A is a view showing a multi-panel display device according to the related art.
Figure 8B:
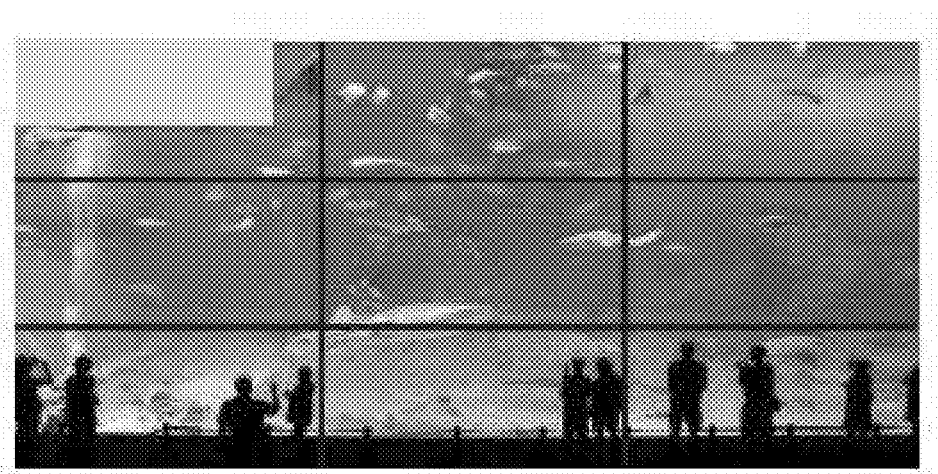
FIG. 8B is a view showing a multi-panel display device according to a sixth embodiment of the present disclosure.

FIG. 8A is a view showing a multi-panel display device according to the related art, and FIG. 8B is a view showing a multi-panel display device according to a sixth embodiment of the present disclosure.

The bezel of the multi-panel display device of FIG. 8A has the same width as the bezel of the multi-panel display device of FIG. 8B. In addition, each of the plurality of LCD devices of the multi-panel display device of FIG. 8A does not include the second LED assembly, and each of the plurality of LCD devices of the multi-panel display device 300 of FIG. 8A includes the second LED assembly 129.

In FIG. 8A, when the plurality of LCD devices are disposed in a tile shape, an image severance phenomenon may occur due to the bezel of each of the plurality of LCD devices.

In FIG. 8B, each of the plurality of LCD devices 100*a* and 100*b* of the multi-panel display device 300 includes the light guide bar 220 of the main frame 200 and the second LED assembly 129 of the auxiliary light source under the light guide bar 220. Since the light is uniformly supplied to the edge portions of the liquid crystal panel 110, the brightness of the edge portions of each of the plurality of LCD devices 100*a* and 100*b* increases.

Accordingly, the bezel D of each of the plurality of LCD devices 100*a* and 100*b* may be recognized to be reduced, and the image severance phenomenon for the image displayed by the plurality of LCD devices 100*a* and 100*b* may be recognized to be minimized. Since a contrast ratio in the edge portions of the bezel D of the plurality of LCD devices 100*a* and 100*b* increases according to increase of the brightness in the edge portions of the plurality of LCD devices 100*a* and 100*b*, a user may recognize the width of the bezel D to be reduced.

Although the plurality of optical members 310*a* and 310*b* are disposed over the plurality of LCD devices 100*a* and 100*b* in the sixth embodiment, the plurality of optical members 310*a* and 310*b* each having a rectangular ring shape may be disposed only over the edge portions of each of the plurality of LCD devices 100*a* and 100*b* in another embodiment.

Consequently, in the LCD device 100 according to the first to fifth embodiments of the present disclosure and the multi-panel display device 300 according to the sixth embodiment of the present disclosure, since the light guide bar 220 is disposed on the main frame 200 surrounding the edge portions of the liquid crystal panel 110 and the backlight unit 120 and the second LED assembly 129 of the auxiliary light source of the backlight unit 120 is disposed under the light guide bar 220, the light is uniformly supplied to the edge portions of the liquid crystal panel 110. Since the light is uniformly supplied to the whole region of the liquid crystal panel 110, the display region AA of the liquid crystal panel 110 is enlarged and the non-display region NA except the display region AA is reduced, the LCD device 100, 100*a* and 100*b* having a narrow bezel D is obtained.

In the multi-panel display device 300 according to the sixth embodiment, the image severance phenomenon is prevented due to each of the plurality of LCD devices 100*a* and 100*b* having a narrow bezel D. In addition, since the brightness in the edge portions of each of the plurality of LCD devices 100*a* and 100*b* increases, the bezel D of each of the plurality of LCD devices 100*a* and 100*b* is recognized to be reduced even when the bezel has the width corresponding to the related art bezel. As a result, the image severance phenomenon is minimized.

It will be apparent to those skilled in the art that various modifications and variations can be made in a backplate and a foldable display device including the same of the present disclosure without departing from the sprit or scope of the disclosure. Thus, it is intended that the present disclosure covers the modifications and variations of these aspects provided they come within the scope of the appended claims and their equivalents.

What is claimed is:

1. A display device, comprising:
   a first liquid crystal liquid crystal display (LCD) device, comprising:
   a liquid crystal panel;
   a backlight unit under the liquid crystal panel, the backlight unit including a first light emitting diode (LED) assembly having a plurality of first LEDs, a second LED assembly having a plurality of second LEDs, a diffusing plate, a reflecting plate and an optical sheet;
   a main frame having a rectangular ring shape and surrounding the liquid crystal panel and the backlight unit, the main frame including a vertical part and a light guide bar protruding from an inner surface of the vertical part, the second LED assembly disposed under the light guide bar; and
   a bottom frame combined with the main frame, the liquid crystal panel and the backlight unit are disposed on the bottom frame.

2. The display device of claim 1, wherein a light emitted from the second LED assembly and incident to the light guide bar is processed as a surface light source and is supplied to edge portions of the liquid crystal panel.

3. The display device of claim 1, wherein the light guide bar comprises:
   a first horizontal surface perpendicularly extending from the vertical part;
   a first slanting surface obliquely extending from an edge portion of the first horizontal surface with an obtuse angle toward a rear surface of the vertical part;
   a second slanting surface obliquely extending from an opposite surface of the first horizontal surface; and
   a second horizontal surface connected to the first and second slanting surfaces.

4. The display device of claim 3, wherein the second LED assembly is disposed in an inner space between the inner surface of the vertical part and the second slanting surface.

5. The display device of claim 4, wherein the light guide bar further comprises a chamfer part on the second slanting surface, wherein the chamfer part has a light incident surface parallel to the first horizontal surface, and the plurality of second LEDs are disposed to face into the light incident surface.

6. The display device of claim 5, wherein the second slanting surface has a pattern.

7. The display device of claim 3, wherein the backlight unit further includes an LED housing having a step part under the second LED assembly, and a hook protruding from the second horizontal surface is assembled with the step part.

8. The display device of claim 7, wherein the LED housing has a hole, and the hook is inserted into the hole and is assembled with the step part.

9. The display device of claim 3, wherein the light guide bar further comprises a third slanting surface between the first horizontal surface and the first slanting surface with obtuse angles.

10. The display device of claim 9, wherein a first connecting portion between the first horizontal surface and the third slanting surface and a second connecting portion between the third horizontal surface and the first horizontal surface are rounded.

11. The display device of claim 3, wherein a portion of the vertical part and the first horizontal surface is removed at a corner region of the main frame, and a reflecting sheet is disposed at the corner region.

12. The display device of claim 1, wherein the vertical part includes a synthetic resin, and the light guide bar includes one of polymethylmethacrylate (PMMA) and polycarbonate (PC).

13. The display device of claim 1, wherein an edge portion of a rear surface of the liquid crystal panel is disposed on and supported by a front surface of the vertical part, and an edge portion of a rear surface of the diffusing plate and the optical sheet is disposed on and supported by the first horizontal surface.

14. The display device of claim 1, further comprising a first optical member over the first LCD device, wherein the first LCD device includes a display region and a non-display region surrounding the display region, and the first optical member includes a non-expansion region corresponding to a first portion of the display region and an expansion region corresponding to the non-display region and a second portion surrounding the first portion.

15. The display device of claim 14, further comprising:
a second LCD device adjacent to the first LCD device; and
a second optical member over the second LCD device and adjacent to the first optical member.

16. The display device of claim 15, wherein each of the first and second optical members includes an optical fiber having an input surface corresponding to a pixel of each of the first and second LCD devices and an output surface opposite to the input surface,
wherein the optical fiber includes a first optical fiber of a straight type in the non-expansion region and a second optical fiber of a bent type in the expansion region, and
wherein the input surface and the output surface of the second optical fiber correspond to the display region and the non-display region, respectively.

17. The display device of claim 16, wherein an area of the output surface of the second optical fiber is greater than an area of the input surface of the second optical fiber.

* * * * *